UNITED STATES PATENT OFFICE.

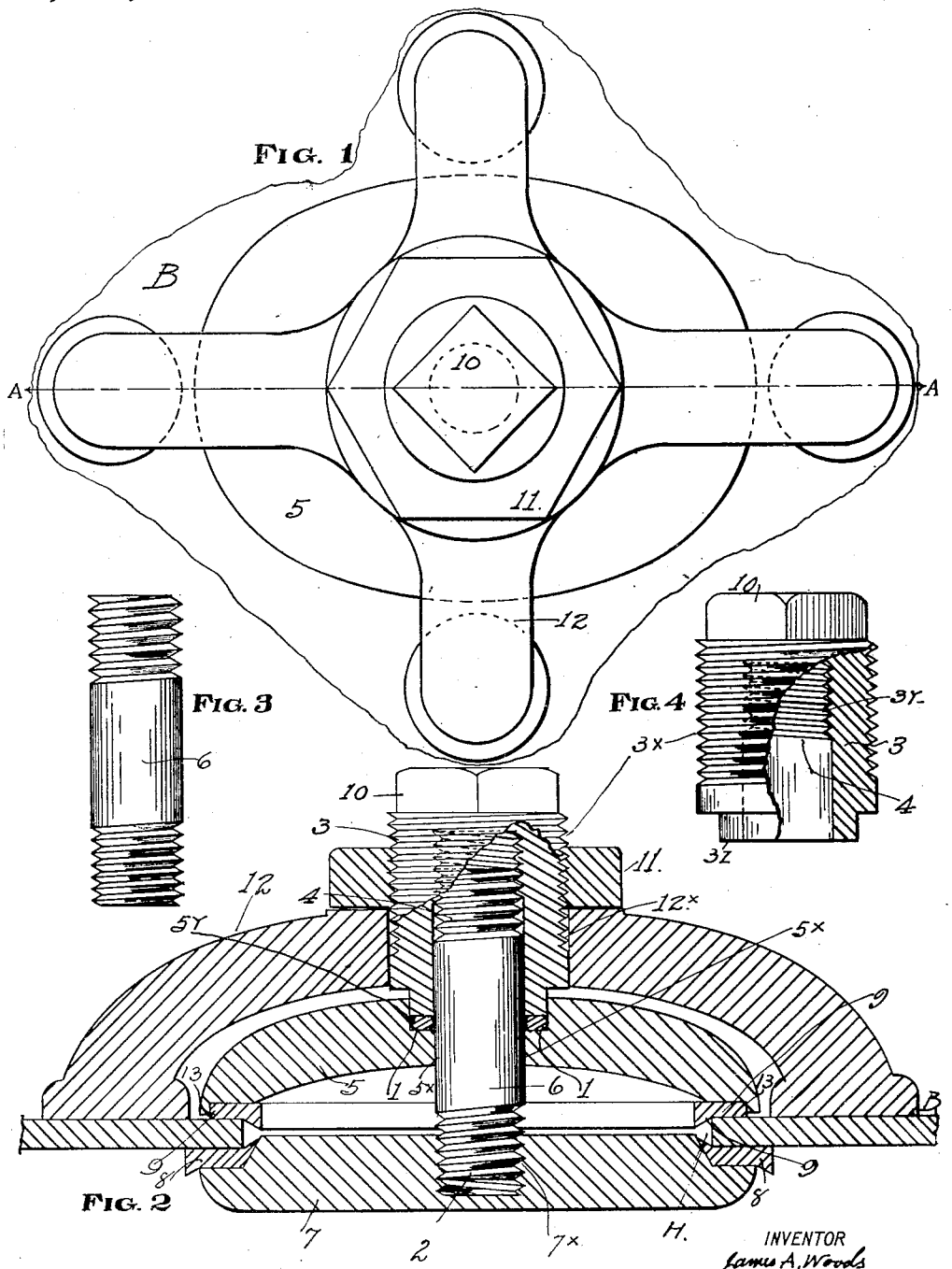

JAMES A. WOODS, OF WICHITA, KANSAS.

HANDHOLE-PLATE.

1,336,012.  Specification of Letters Patent.  Patented Apr. 6, 1920.

Application filed December 23, 1919. Serial No. 346,923.

*To all whom it may concern:*

Be it known that I, JAMES A. WOODS, a citizen of the United States, and a resident of Wichita, in the county of Sedgwick and State of Kansas, have invented certain new and useful Improvements in Handhole-Plates, of which the following is a description, referring to the accompanying drawings, which form a part of this specification.

The invention is especially applicable to steam boiler practice having reference to a hand hole through a boiler and means for packing securely said hole for boiler operation and to eliminate the necessity of shut downs for repairs at inopportune times and to a means for signaling the deterioration of the packing. The above and other allied features are more fully explained by reference to the accompanying drawings in which Figure 1 is a top view of my hand hole plate considered in operative position upon a steam boiler. Fig. 2 represents a sectional view of the parts of the invention taken along the line A—A in Fig. 1. Fig. 3 represents the stud bolt seen in Fig. 2. Fig. 4 shows the cap seen in Fig. 2 parts being removed for a fuller understanding of its functional relationship to the stud bolt and allied parts.

Similar numerals of reference indicate corresponding parts in all the figures of the drawings.

Referring to the drawings, through a steam boiler B is seen a hand hole H, this hole H is closed against steam escape by my hand hole plate comprising packings 1, 8 and 9 and allied clamping members acting in combination therewith.

The gasket 8 as in common practice is arranged within and around the edge of the hole H, a press plate 7 is drawn against the gasket 8 to close the opening H by means of a stud bolt 2 which is screwed into the plate 7 as at $7^x$; at 12 is seen a four way spider contacting the boiler without the hole H, this spider is provided with a smooth hole $12^x$ through the center thereof to receive the cap 3.

The cap 3 is reamed out upwardly from the base thereof to a point 4 and above which is a threaded hole $3^y$ into which as shown in Fig. 2 the stud bolt 2 is screwed. This stud bolt 2 is not threaded at its central portion 6 but is left smooth to pass through a central hole $5^x$ in the auxiliary press plate 5 engaging against the packing 9 without the hole H. The upper portion of hole $5^x$ is enlarged at $5^y$ to form a packing chamber to receive the emergency packing 1 which is round and when compressed is flattened to fill the shape of the packing chamber. In assembling the parts a wrench engages the capnut 10 on screw cap 3 to screw same down on the stud-bolt 2 and enter the cap 3 into the hole $12^x$ in the spider 12. The base $3^z$ of cap 3 is fashioned to fit within the hole $5^y$ and by the screw pressure exerted the parts 5 and 7 are drawn together to compress the packings 8 and 9 and at the same time packing 1 is compressed by the base $3^z$ of the cap 3. The parts are more firmly compressed by the nut 11 on cap 3 engaging against the spider 12. In customary practice the gasket 8 deteriorates and steam escapes during working hours necessitating a shut down for repairs, however by the use of my invention the packings 9 and 1 will provide sufficient resistance so that a time may elapse to let the steam go down and the gasket 8 be replaced outside of working hours. By slightly releasing the pressure on the plate 5 a signal of escaping steam will occur only when gasket 8 has deteriorated then by applying the wrench to the nut 10 sufficient tension is given the auxiliary packings to permit of waiting for an opportune time to replace the packing 8. The plate 5 is shouldered at 13 to obviate the boiler pressure from blowing the packing 9 out before the plate 5 can be tightened down upon it.

Such modifications may be employed as lie within the scope of the appended claims.

Having fully described my invention what I now claim as new and desire to secure by Letters Patent is:

1. A composite plate for closing handholes in boilers and the like including an inner press plate, an outer spider, an intermediate press plate and a threaded bolt freely passed through said intermediate plate to engage said inner plate and a cap passable through said spider, said cap being arranged to receive and engage the outer screw end of said bolt; and three packing rings arranged respectively in contacting relationship with the outer rim portion of each of said press plates and the base of said cap within a recessed packing chamber surrounding said bolt substantially as specified.

2. In combination with a boiler or the like, a handhole a gasket ring adjacent the inner periphery of said hole, an inner press plate contacting said gasket, a spider in contact with the exterior surface of said boiler plate surrounding said hand hole, an auxiliary press plate having a central hole, arranged intermediate said spider and outer boiler plate surface, a packing arranged in contacting relationship between the outer rim periphery of said hand hole and the rim portion of said auxiliary press plate, a threaded cap passed within a smooth central hole through said spider, said cap being recessed and threaded and engaging a threaded bolt also engaging through the central hole of said auxiliary plate with a threaded hole in the inner press plate, a packing ring intermediate the base of said cap and a packing chamber adjacent said bolt in the outer face of said auxiliary press plate, screw pressure exerted by means of said cap operating to compress the several packings substantially as specified.

3. In a boiler or the like, a hand hole, a gasket ring adjacent the inner periphery of said hand hole, an inner press plate contacting said gasket, a spider in contact with the exterior surface of said boiler plate surrounding said hand hole, an auxiliary press plate having a central hole, intermediate said spider and exterior boiler plate surface, a packing arranged in contacting relationship between the outer rim periphery of said hand hole and a recessed rim portion of said auxiliary press plate, a threaded cap passed within a smooth central hole through said spider, said cap being recessed and threaded and engaging a threaded bolt also engaging through the central hole of said auxiliary plate with a threaded hole in the inner press plate, a nut on said cap adjacent the outer surface of said spider, a packing ring intermediate the base of said cap and a packing chamber adjacent said bolt in the outer face of said auxiliary press plate; screw pressure exerted by means of said cap and nut operating to compress the several packings substantially as specified.

JAMES A. WOODS.

Witnesses:
   W. A. NETHERCOT,
   W. C. MOYER.